(12) United States Patent
Mcleod (10) Patent No.: US 8,727,643 B2
(45) Date of Patent: May 20, 2014

(54) IMAGING DEVICE MOUNT FOR INTERCONNECTION WITH SIGHTING DEVICES

(76) Inventor: Levi Mcleod, Delta, CO (US)

( * ) Notice: Subject to any disclaimer, the term of this patent is extended or adjusted under 35 U.S.C. 154(b) by 101 days.

(21) Appl. No.: 13/344,356

(22) Filed: Jan. 5, 2012

(65) Prior Publication Data

US 2012/0174375 A1    Jul. 12, 2012

Related U.S. Application Data

(60) Provisional application No. 61/430,329, filed on Jan. 6, 2011.

(51) Int. Cl.
*G03B 17/00* (2006.01)

(52) U.S. Cl.
USPC ........................................................ 396/422

(58) Field of Classification Search
USPC ......... 396/419, 422, 426, 428, 429, 432, 544;
348/373–376; 248/176.1, 187.1, 183.3,
248/229.1, 229.13, 560
See application file for complete search history.

(56) References Cited

U.S. PATENT DOCUMENTS

| | | | |
|---|---|---|---|
| 3,545,356 A | 12/1970 | Nielsen | |
| 3,682,070 A | 8/1972 | Kiceniuk | |
| 4,309,095 A | 1/1982 | Buckley | |
| 4,835,621 A | 5/1989 | Black | |
| 5,020,262 A | 6/1991 | Pena | |
| 5,826,363 A | 10/1998 | Olson | |
| 5,863,021 A * | 1/1999 | Nichols | 248/229.23 |
| 6,088,053 A | 7/2000 | Hammack et al. | |
| 6,244,759 B1 | 6/2001 | Russo | |
| 6,526,956 B1 | 3/2003 | Hankins | |
| 7,085,491 B2 * | 8/2006 | Chiang | 396/432 |
| 7,277,119 B2 | 10/2007 | Hammack et al. | |
| 7,574,810 B1 | 8/2009 | LoRocco | |
| 2002/0089201 A1 | 7/2002 | Seegmiller et al. | |
| 2005/0179799 A1 | 8/2005 | Umanskiy et al. | |
| 2011/0069947 A1 * | 3/2011 | Orf | 396/419 |

OTHER PUBLICATIONS

Elusive Wildlife Technologies Camera Mount for Rifles, Bows or Shotguns, printed Sep. 8, 2010, www.elusivewildlife.com/catalog.php?, 1 page.
iPod Touch mounted on M110 Sniper Rifle, The Firearm Blog, printed on Sep. 8, 2010, 11 pages.
Mad Dog ATV Cell Phone Mount, Explore Products.com, 2002, www.exploreproducts.com/maddogatvcellphonemount, 2 pages.

* cited by examiner

*Primary Examiner* — W B Perkey
*Assistant Examiner* — Minh Phan
(74) *Attorney, Agent, or Firm* — Sheridan Ross P.C.

(57) ABSTRACT

A device for use in connection with various viewing and imaging devices is disclosed. More specifically, a mount is provided that is both capable of being attached to preexisting viewing devices, such as spotting scopes, rifle scopes, and other magnification devices, and further accommodating preexisting image recording and/or displaying devices, such as cameras and cameras phones. Features and advantages of both preexisting viewing and image recording devices may therefore be used in concert with one another.

7 Claims, 7 Drawing Sheets

IMAGING DEVICE MOUNT FOR INTERCONNECTION WITH SIGHTING DEVICES

This application claims the benefit of priority from U.S. Patent Application No. 61/430,329 filed Jan. 6, 2011, the entire disclosure of which is hereby incorporated by reference in its entirety.

FIELD OF THE INVENTION

The present invention relates generally to systems and devices for receiving and selectively maintaining imaging, sighting mechanisms and display devices. More specifically, the present invention relates to systems and devices for attaching imaging, sensing and/or transmitting devices to various sighting or aiming devices such as spotting scopes, rifle scopes, binoculars, etc.

BACKGROUND

The use of personal electronic devices is well known. Given the advancement of technologies such as the cellular telephone, still cameras, smart phones, video cameras, music players, personal digital assistants, and similar portable electronic devices, these devices have become exceedingly small, lightweight, portable, and common. Indeed, many of these devices or features of these devices are now commonly found in a single apparatus, and have imaging capabilities similar to a standalone camera.

In a heretofore unrelated industry, a number of devices have been developed for viewing, sighting, and/or targeting objects. These devices include, but are not limited to rifle scopes, binoculars, monoculars, telescopes, spotting scopes, range finders, and various other similar devices. These known systems and devices, commonly used by hunters, shooters, archers, bird watchers, golfers, etc., are devoid of features for accommodating, receiving, protecting, and/or selectively maintaining a portable electronic device, such as a camera-phone. Thus, there is a long-felt but unmet need to provide a device for receiving and securing an image-recording and/or displaying device on a portion of a viewing or sighting device such that the devices or systems may be used in concert with one another.

SUMMARY OF THE INVENTION

Accordingly, the present invention contemplates novel systems, methods and devices for attaching a portable electronic device, such as an image-sensing or image-displaying device such as a smart phone or camera, to a sighting or spotting device, such as a rifle or spotting scope.

In further support of the present disclosure, the following references are hereby incorporated by reference in their entireties: U.S. Pat. No. 3,545,356 to Nielsen, U.S. Pat. No. 3,682,070 to Kiceniuk, U.S. Pat. No. 4,309,095 to Buckley, U.S. Pat. No. 4,835,621 to Black, U.S. Pat. No. 5,020,262 to Pena, U.S. Pat. No. 5,826,363 to Olson, U.S. Pat. No. 6,088,053 to Hammack et al., U.S. Pat. No. 6,244,759 to Russo, U.S. Pat. No. 6,526,956 to Hankins, and U.S. Pat. No. 7,277,119 to Hammack et al., and US Patent Application Publication Numbers: 2002/0089201 to Seegmiller et al. and 2005/0179799 to Umanskiy et al.

In various embodiments, the present invention comprises a mount for attaching to a viewing device and for further receiving an image recording. For example, in a particular embodiment, the present invention comprises a mount for receiving or being secured around one or more pre-existing viewing features of a device (e.g. oculars or eye cups of a pair of binoculars). The device further comprises a portion for accommodating one or more additional devices, such as an iPod, digital camera, or camera-phone. In various embodiments, additional devices are received by the mount in a manner that allows for the alignment of lenses or image sensing components to align with a sight line of the viewing device. Thus, in various embodiments, the first and second devices are selectively secured and features of the second device are allowed to operate in conjunction with features of the first device and vice versa. For example, where camera phones are known to have limited range or zoom features due to their general lack of optical zoom, the range/zoom features of an additional device, such as a telescope, can be utilized to view, capture, and/or record images or events.

In one embodiment, the present invention comprises a mount that attaches or is secured to a viewing device with a clamp type of device, the clamp comprising one or more hinged arms biased toward a closed position and expandable by a user-applied force. The clamp may additionally comprise gripping features, such as protrusions, indentations, and/or rubber or other materials and members with a high coefficient of friction. The mount further comprises a device-receiving portion with one or more clamps or swing arms for receiving and securing an imaging device.

In an alternative embodiment, a mount for an imaging device is provided, the mount having a first aperture having an initial diameter comprising an elastic material, the aperture adapted for selectively attaching to a first device (e.g. scope). A second aperture may be provided, the second aperture adapted for selectively attaching, surrounding, or accommodating an imaging device (e.g. camera-phone). In one embodiment, an image sensing feature of the imaging device is aligned with a predetermined line of sight of the first device when the first device and the imaging device are selectively attached to the mount, such that images viewed by the first device may be similarly viewed and/or recorded by the imaging device.

In various embodiments, the present invention contemplates accommodating any number of viewing devices and/or personal electronic devices. For example, in one embodiment, the present invention comprises a gripping feature for receiving or accommodating a first viewing device wherein the gripping feature is selectively adjustable to securely accommodate or be affixed to different viewing devices and/or different portions/components of the viewing device(s). A variety of known devices may be employed or integrated with the present invention in order to provide this adjustability. For example, hose clamps, wire ties, elastomeric rings, clamps, vice grips, v-band clamps, and similar devices may be provided, alone or in combination, to secure a mount of the present invention to a first viewing device and/or securing a second device within the mount. In one embodiment, the elasticity of the mount device itself is adequate to secure the mount to a viewing device.

In various embodiments, the present invention comprises a mount adapted for connection to an archery bow. It is contemplated that a mount may be provided which is adapted for selectively removable interconnection with various components of a bow including, but not limited to a riser portion of a bow. Many existing risers comprise a threaded portion for receiving various items, such as a stabilizer bar. In one embodiment, a mount is provided that is capable of being connected with a bow riser in addition to or in lieu of a stabilizer bar or similar feature. For example, the mount may comprise an extension member with a threaded portion for being selectively connected to a pre-existing threaded aperture of a bow.

In various embodiments, the present invention comprises features for protecting and/or insulating devices from the elements, shock, abrasion, etc. In various embodiments, the present invention comprises a substantially elastomeric material, including, but not limited to rubber, natural rubber, synthetic polyisoprene, butyl rubber, polybutadiene, styrene-butadiene, nitrile rubber, chloropresne, ethylene propylene rubber, polyacrylic rubber, silicone rubber, ethylene-vinyl acetate, and various thermoplastics. In one embodiment, a sufficient amount of elastomeric material is provided, the elastomeric material being at least partially in contact with a device housed within the mount such that the device is substantially protected from shock. For example, where a mount is provided for attachment to a rifle scope and further adapted to house a sensitive electronic device, such as a camera-phone, it may be desirable to provide for shock protection to minimize potential adverse affects of a rifle's recoil on the camera-phone. Similarly, regardless of the viewing device to which a mount is to be secured, it may be generally desirable to protect a personal electronic device from impact-related damages. Accordingly, in various embodiments, a mount comprises elastomeric or shock absorbent material(s) adapted for contacting and/or protecting devices to be housed within the mount.

Furthermore, as the present invention is contemplated for use in various activities which may occur outdoors and in inclement weather conditions, it is contemplated that at least a portion of the mount be comprised of a material that is substantially impermeable to water. In one embodiment, at least a portion of the mount is comprised of a rubber substantially impermeable to water and adapted to surround sensitive features and/or apertures of an electronic device while still allowing for visibility of certain features (e.g. a screen) and access to necessary features or components (e.g. buttons and switches).

In various embodiments, the present invention comprises a mount for securely accommodating a portable electronic device. In one embodiment, the mount is sized so as to securely fit a known electronic device and requires manipulation of an at least partially elastic material in order to place or secure the device within the mount. Thus, an interference fit of sorts is provided wherein insertion and removal of a potentially valuable electronic device requires a degree of user manipulation so as to substantially reduce the risk of loss or unintentional removal of the device.

In one embodiment, a mount of the present invention is provided with a number of selectively removable and insertable spacers or inserts. It is known that there currently exist numerous devices which may capture or display images. For example, even within the camera-phone market alone, there exist hundreds and potentially thousands of devices which a user may desire to use in connection with the present invention. These devices are known to be of different sizes and shapes. Thus, in at least one embodiment, the present invention comprises spacers or other forms of adjustment mechanisms for selectively accommodating a wide variety of devices with different dimensions.

In various embodiments, more intricate and complex systems may be employed which allow movement and adjustment in a vertical and horizontal plane and a means for securing the device in a specified position.

In various embodiments, the present invention comprises features for accommodating a pre-existing lens or imaging component of personal electronic device. It is known that various image sensing devices comprise a lens element at various different locations. Thus, in one embodiment, various different apertures are formed in a portion of the mount, the apertures corresponding to known positions and/or orientations of pre-existing lenses on different image recording equipment. In one embodiment, the present invention comprises a mount capable of accommodating various different image recording devices wherein apertures are provided with selectively removable plugs or portions. For example, in one embodiment, a mount is provided with perforated portions representing locations which may be removed by a user in order to accommodate a specific device. In one embodiment, numerous apertures are provided with plugs or selectively removable/insertable portions so that a single mount can accommodate a number of different devices, yet without offering an excess number of apertures through which water and contaminants may enter.

Various embodiments contemplate and provide for the ability to rotate a mount device about at least one axis. For example, in a particular embodiment, the present invention comprises the ability to rotate a mount for receiving various devices to a position of non-use (e.g. where additional space or visibility through a sighting device is preferred). Thus, where viewing or recording of images on a device disposed within a mount of the present invention is not desired/required, the device may be rotated or folded out of the way. One of skill in the art will recognize that moving or rotating a mount to a position of non-use may be accomplished through rotation in any number of axis or combinations thereof. Thus, the invention is not limited to any particular axis of rotation.

In various embodiments, a telescoping attachment is provided for connecting a mount to a sighting, spotting, viewing or similar device. One of skill in the art will recognize that the optics of the viewing device and the image receiving device are dependent upon numerous factors, including, but not limited to the distance to the target object, focal length, zoom, etc. Thus, in order to capture the desired image (e.g. capture a focused image), it may necessary to obtain an appropriate physical relationship between a viewing device and an image sensing device. Accordingly, as mounting an image sensing device directly against a viewing device may not provide an optimal arrangement, embodiments of the present invention contemplate a connecting member that is telescoping or translatable such that the spatial relationship between the camera and the viewing device can be adjusted and the desired image obtained.

In various embodiments, the present invention comprises a mount with the ability to adjust the vertical and/or horizontal position of the mount once the mount is attached or secured to a viewing device. For example, in one embodiment, a mount is provided with one or more tracks adapted for translating the mount in a horizontal and/or vertical direction with respect to a viewing device so that an optimal spatial arrangement may be achieved between an imaging device and a viewing device.

U.S. Pat. No. 7,574,810 to LoRocco, which discloses features for adjusting a vertical and horizontal position of a device, is hereby incorporated by reference in its entirety. In one embodiment, a mount of the present invention is translatable with respect to a viewing device and comprises tracks or elongate apertures such that a viewing feature of lens of the imaging device is not obstructed when the mount is displaced to various positions.

Although various references are made herein with respect to a mount receiving an imaging device, it will be understood that the present invention is not limited to receiving any particular device. Indeed, with the development of devices such as iPods, iPads, PDA's, Global Positioning Systems ("GPS") etc., it is contemplated that various mounts of the present invention may accommodate, for example, devices adapted for displaying rather than receiving information. For example, in one embodiment, a device adapted solely for displaying information is mounted to a viewing device and information related to latitude, longitude, wind, temperature, plant and/or animal identification, sunrise/sunset, etc. is displayed to a user.

In one embodiment of the present invention, a mount device is provided for mounting on a viewing device and further containing or receiving an electronic image sensing and/or displaying device. The mount is attached to a pair of binoculars, for example, such that the mount substantially surrounds an ocular and provides a stable platform for receiving an imaging device. The imaging device, which may be disposed in the mount either before or after the mount is positioned on the viewing device (i.e. binoculars), is securely positioned with the mount such that it is capable of viewing objects or receiving images through the binoculars. Accordingly, images viewed through the binoculars may be viewed on the imaging device and expanded, recorded, "blown-up," and/or saved for later modification, dissemination, etc. Accordingly, in various embodiments, the present invention obviates the need for expensive and cumbersome recording equipment by enabling a user to leverage pre-existing and/or pre-owned devices.

Alternative embodiments contemplate a device adapted for use and/or attachment to more than one ocular. In such alternative embodiments, a user's ability to view objects directly through the binoculars is effectively replaced by the ability to view/capture a viewing devices' full field of view with a personal electronic (or similar) device.

In various embodiments of the present invention, wherein an electronic device is substantially surrounded by a mount, an aperture is formed in a periphery of the mount. In such embodiments, the aperture provides access to necessary features and/or controls of a personal electronic device. For example, as will be recognized by one of ordinary skill, it may often be necessary to interact with various features of a device to be inserted within the mount, such as to power on/off the device, take pictures, or navigate through various features of the device.

In various embodiments, at least a portion of the main aperture and/or additional aperture comprise features adapted for grasping or securing a device(s). For example, in one embodiment, the main aperture comprises an elastic diameter such that it may be stretched to fit over various portions of various different viewing devices in a secure manner. Similarly, additional apertures may comprise elastic properties such that an imaging device may not be inserted or removed from a mount without user manipulation.

In various embodiments, a mount is provided in connection with a scope or similar feature through permanent or semi-permanent connection means. Permanent and semi-permanent connection means include, but are not limited to various fasteners, compression and/or frictional fit members, adhesives, and clamps.

For example, in a particular embodiment, a mount is secured to a portion of a scope by a circular aperture designed to fit tightly around an existing scope such that a frictional fit is provided. The circular aperture may comprise plastic or rubber which allows the aperture to fit around existing scope features and further provides sufficient rigidity to support the weight of the remainder of the mount and associated device.

In yet another embodiment, a mount member is secured to a scope or similar device by one or more selectively adjustable circular clamps. For example, various features of known pipe clamps and hose clamps are employed in the present invention to fixedly secure the mount device to a scope or sighting device. Features of known worm gear clamps, for example, are provided to tighten and secure the mount around a scope at a desired location and in a manner that requires sufficient intentional action by a user (e.g. unscrewing the clamp with a tool) to loosen and/or remove the mount member.

In various embodiments, the mount member is secured to a scope or sighting device through one or more set screws which apply a force to or mate with the scope. That is, in addition to or in lieu of fasteners disposed generally tangential to a circular clamp for tightening the clamp, fasteners or set screws may be provided that project inwardly toward a portion of the sighting device to secure a mount member thereto.

In various embodiments, the present invention comprises a mount with various degrees of freedom for movement with respect to a sighting device. For example, in one embodiment, the present invention comprises features for fine adjustment of the mount with respect to a sighting device in a horizontal and/or vertical direction. Dials may be provided to translate the mount along one or more predetermined paths and thereby achieve a user-desired position with respect to the sighting device. In one embodiment, the mount is hinged or rotatable, either with respect to itself and/or with respect to a sighting device such that the mount and housed device may be selectively rotated (e.g. out of a primary line of sight of a sighting device when use of the mount/housed device is not desired). In various embodiments, the present invention comprises means, such as cam-locks and similar devices, for securing a rotatable or translatable mount in a desired position.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

DETAILED DESCRIPTION

Figure 1:
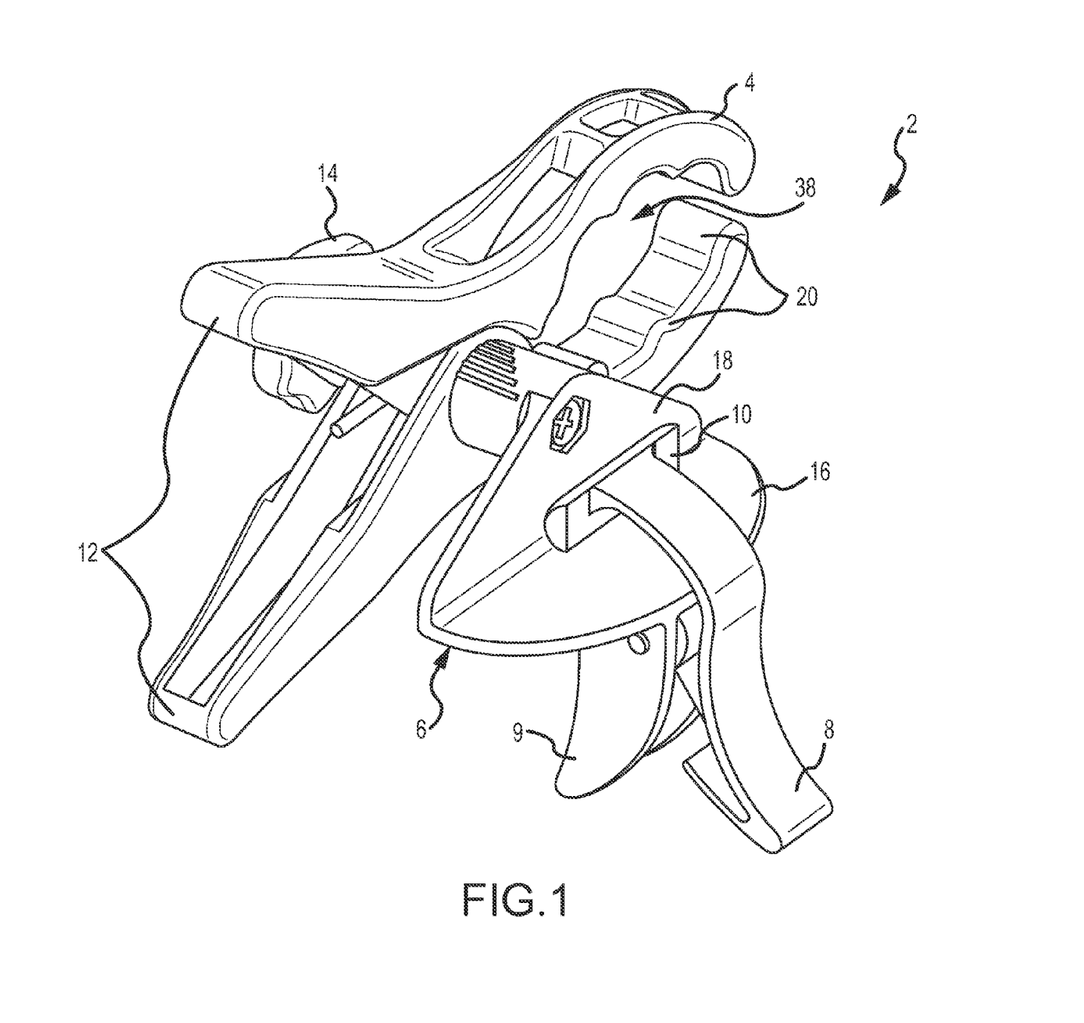
FIG. 1 is a front perspective view of an imaging device mount according to one embodiment.

FIG. 1 is a front perspective view of one embodiment of an imaging device mount 2. As shown, the mount 2 comprises a first portion 4 for securing the device 2 to a sighting device or similar object (not shown in FIG. 1) and a second portion 6 for selectively receiving an imaging device. In the embodiments shown, the first portion 4 comprises a clamp defining a space 38 within which a device may be received and lever arms 12 providing a user-interface portion for manipulating the position of the first portion 4. The first portion 4 comprises protrusions and/or indentations 20 for providing a desirable gripping surface. In various embodiments, gripping features are provided on the first portion 4, the gripping features comprising one or more materials having a relatively high coefficient of friction for contacting a sighting device.

In a preferred embodiment, the device 2 comprises a second portion 6 for receiving an imaging device, which may include but is not limited to a portable smart phone, a digital camera, a PDA, a digital music player, or any number of devices capable of capturing or recording images. The second portion 6 comprises a first substantially planar portion 16 and a second substantially planar portion 18, wherein the first 16 and second 18 substantially planar portion are disposed substantially perpendicular to one another. A hinged member 8 is provided for selectively securing an imaging device, for example, with the second member 6. A downwardly extending grip portion 9 is provided. The grip portion 9, in one embodiment, comprises a rigid member extending downwardly from the second portion 6 and provides a user interface for aiding the application of force to and rotation of the hinged member 8. In various embodiments, the grip portion 9 is ergonomically shaped to allow for ease of grip and or use and may comprise, for example, a plurality of recessions or protrusions for receiving fingers.

Figure 2:
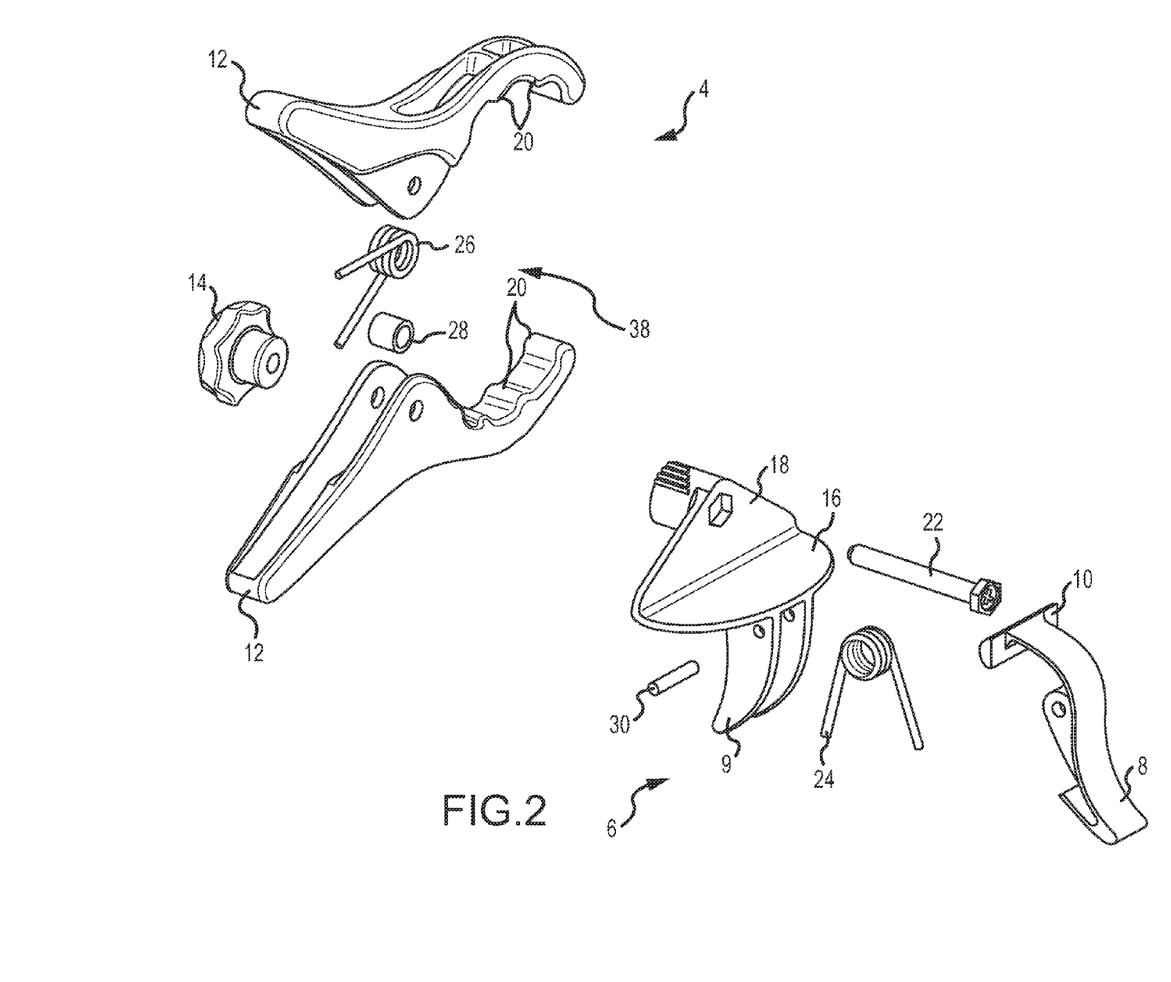
FIG. 2 is an exploded perspective view showing various components of an imaging device mount according to one embodiment.

FIG. 2 is an exploded perspective of an imaging device mount 2 according to a preferred embodiment, showing various internal components thereof. The first portion 4 comprises lever arms 12 and a gripping area 38 disposed opposite a central portion comprising connecting means. A coil or torsion spring 26 is provided at or near the axis of rotation of the first portion 4 for biasing the first member 4 toward a closed or clamped position. a sleeve 28 or washer is provided to guide rotation In a preferred embodiment, the hinged member 8 is biased by a torsion spring 24. Torsion spring 24 biases the hinged member 8 and device contacting feature 10 toward at least one the first 16 and second 18 substantially planar portions. Accordingly, torsion spring 24 which may be secured by a pin 30 provides a rotational force on the hinged member 8 for selectively securing an electronic device within the second portion 6. The device contacting feature 10 may comprise a number of different geometries for applying a force to an electronic device.

In the embodiment provided in FIG. 2, the device contacting feature 10 comprises a transversely extending member convex about its longitudinal axis. The feature 10 may comprise a number of different surface textures and materials including, for example, rubber, foam, plastic, textile, and various other materials suitable for contacting an electronic device as will be recognized by one of ordinary skill in the art.

The first portion 4 and second portion 6 are connected by a fastener 22. Fastener 22 comprises an elongate member extending through aligned apertures in the first 4 and second 6 portions. The fastener 22 is provided with a dial or knob 14 at a distal end, the knob 14 comprising a threaded female portion for receiving the distal end of the fastener 22. At least a portion of the distal end of the fastener 22 comprises a threaded portion for communication with the knob 14. The fastener 22 and knob 14 combination provides numerous benefits in addition to helping secure the first 4 and second 6 portions to one another. For example, the fastener 22 and knob 14 provide a structure whereby the first portion 4 is rotatable with respect to the second portion 6. As one of skill in the art will recognize, it may be desirable to rotate the second portion 6 with respect to the first portion 4 to accommodate various dimensional limitations of an attached device or otherwise align a lens (for example) of an attached device with a sighting device (not shown). In order to adjust rotational position, a user may loosen the fastener 22 and knob 14 combination, selectively adjust rotation, and limit further rotation by tightening the fastener 22 and knob 14. Additionally, the knob 14 and fastener 22 combination allow a user to apply a compression force between the first and second portions of the device and thereby adjust or enhance the clamping ability of the second portion 4.

As will be described further, the clamp of the second portion 4 is biased toward a closed position by a torsion spring 26, such that when external forces are not applied, the clamp will tend toward a closed position. Once the clamp and corresponding gripping area 38 are secured around a sighting device (not shown), a user may further secure the device 2 to the sighting device by tightening the knob 14. Tightening the knob 14 will provide a compression force, as will be recognized, which acts in combination with the torsion spring 26 to prevent undesired opening of the gripping area 38 and/or undesired rotation of the device 2 with respect to the sighting device.

As shown in FIG. 2, first portion 4 generally comprises two portions connected by a fastener 22 and through holes and comprising a biasing member 26. In a preferred embodiment biasing member 26 comprises a torsion spring with extensions that bias a gripping area 38 toward a closed or contracted position. Gripping features 12 are provided opposite the gripping area 38. Gripping features 12 comprise, for example, levers or extensions for user manipulation and for selectively overcoming the force of the torsion spring 26 and opening the gripping area 38. Although shown as linearly extending members, gripping features 12 may comprise any number of ergonomic shapes or features.

Upper and lower portions of the first member 4 each comprise through holes which may be aligned and receive fastener 22 or similar hinge or locking element. In the embodiment shown in FIG. 2, an upper portion of the first member 4 nests within a lower portion such that corresponding through holes are aligned and adapted to receive a fastener 22 which may be in threaded communication with a knob 14 disposed on the distal end of the device. A collar or washer 28 may additionally be provided within the biasing member 26 to further enable movement of the torsion spring 26 and prevent interference between the fastener 22 and torsion spring 26.

Figure 3:
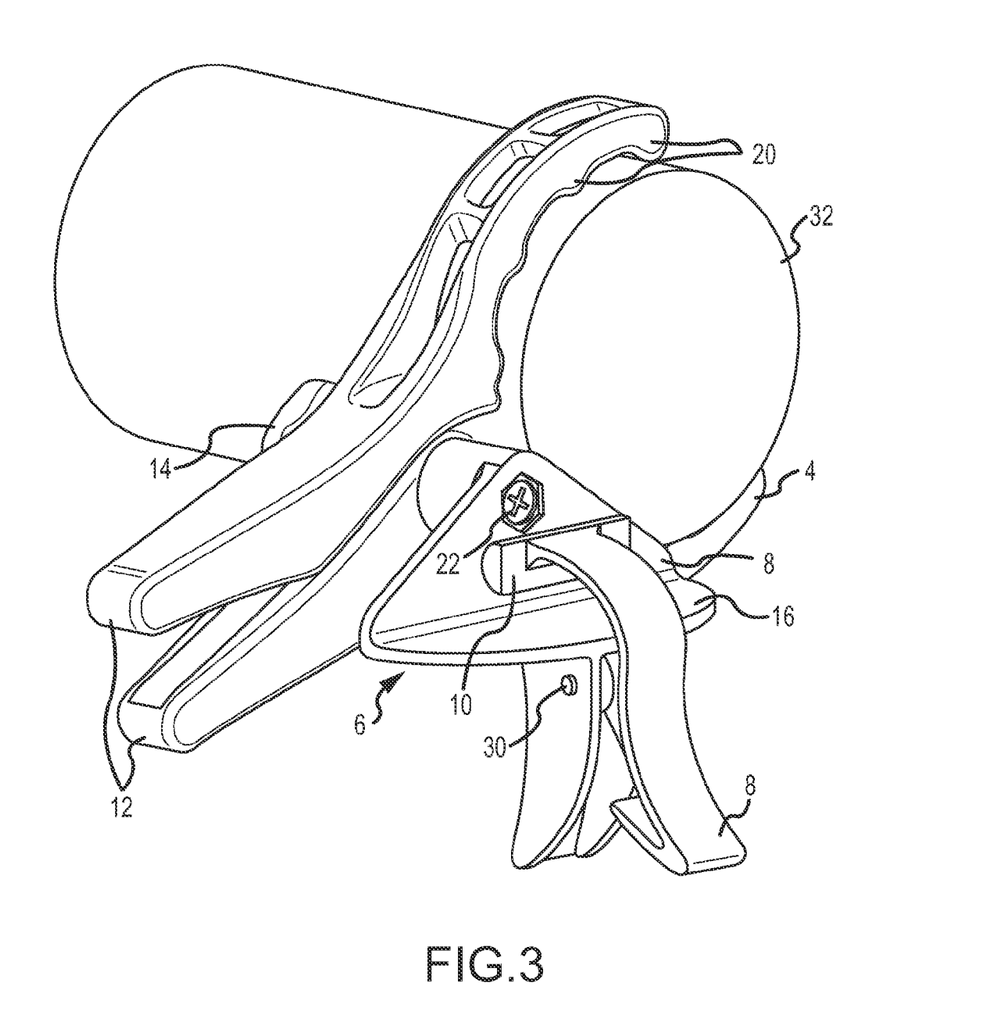
FIG. 3 is a front perspective view of an imaging device mount according to one embodiment attached to a sighting device.

Referring now to FIG. 3, a device 2 is shown secured about a sighting device 32. Sighting devices for use with the present invention include, but are not limited to, rifle scopes, spotting scopes, telescopes, binoculars, monoculars and various other devices and features through which a line of sight may be provided and as will be recognized by one of skill in the art. As shown, first portion 4 is secured to the sighting device 32 by means of a clamp comprising protrusions or indentations 20 to further assist in secure gripping of the device 32. As shown, the first portion 4 is disposed at an angle relative to the second portion 6. First portion 4 and second portion 6 may be positioned relative to each other in various rotational orientations in order to position an imaging or electronic device (not shown) with a line of sight of the sighting device 32. For example, where an electronic device comprises a lens at a fixed location, it may be necessary to adjust the relative position of first portion 4 and second portion 6 such that the lens or similar feature is appropriately aligned with the central axis of the sighting device 32. This alignment may be accomplished in part by the relative rotation of the first portion 4 and second portion 6 of the device 2. Relative rotation may be limited or secured by adjusting knob 14 and corresponding fastener 22.

Figure 4:
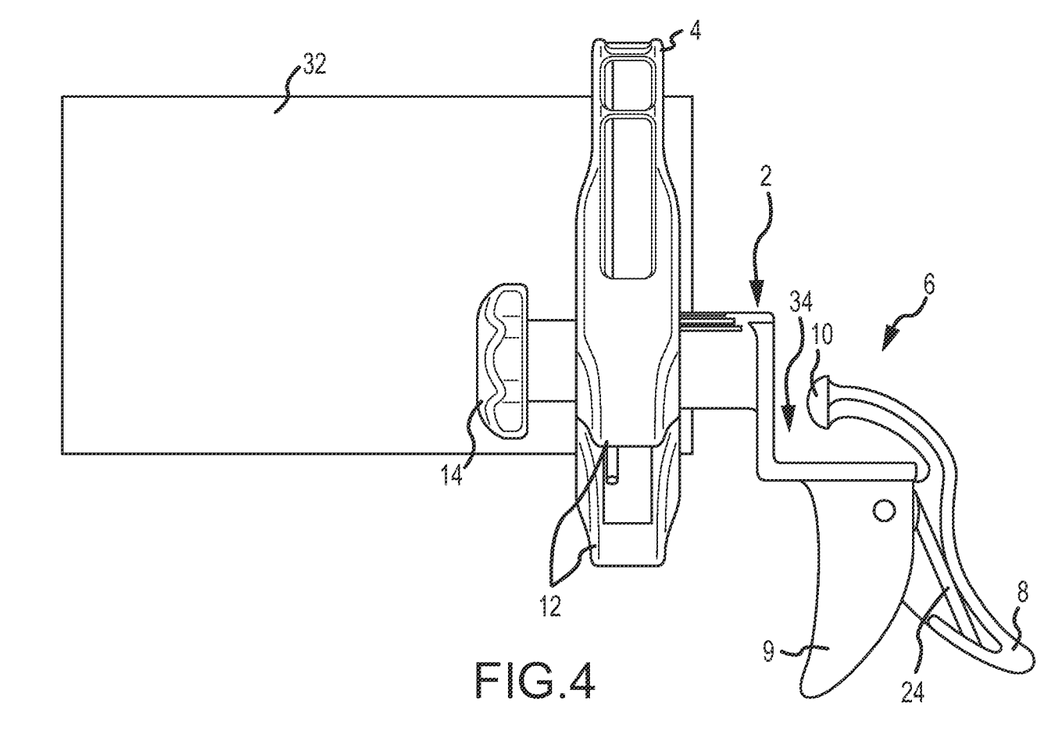
FIG. 4 is a side elevation view of an imaging device mount according to one embodiment attached to a sighting device.

As shown in FIG. 4, a device 2 of the present invention is shown in a side elevation view and attached to sighting device 32. As shown, second portion 6 comprises an area 34 for selectively receiving an electronic or imaging device. An electronic device may be disposed within the device 2 and aligned with an access of the sighting device 32 by selectively expanding space 34. As previously described, second portion 6 comprises a hinged member 8 which is biased towards a closed position by torsion spring 24. Space 34 may be selectively expanded by applying a force to hinge member 8 and/or grip portion 9. Once expanded, an electronic device may be positioned within the space 34 and force removed from hinged member 8. The hinged member and device contacting portion 10 thereafter operate to generally secure the device within the second member. As one of skill in the art will recognize, once a device is secured within space 34 of second member 6, various features and operations of the device may be used in combination with various functionalities of the sighting device 32.

Figure 5:
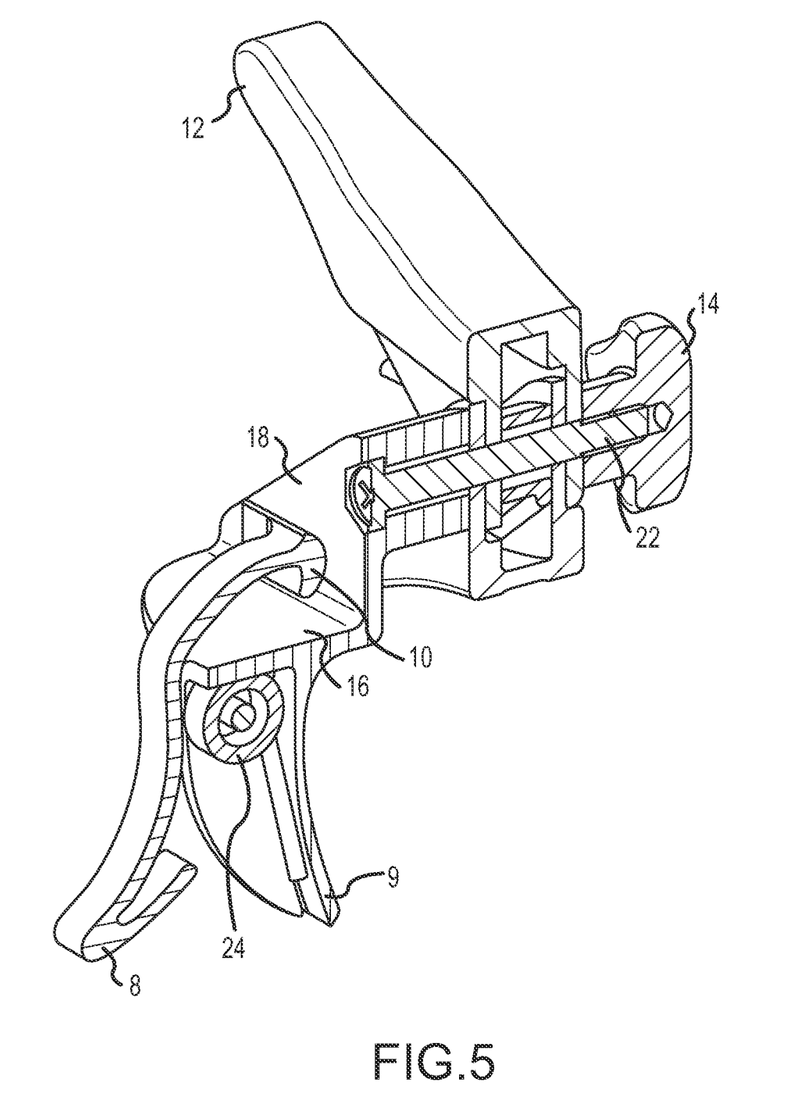
FIG. 5 is a cross-sectional perspective view showing various components of an imaging device mount according to one embodiment.

FIG. 5 is a cross sectional perspective view of one embodiment of the present invention further illustrating the fastener 22 and knob 14 provided to secure first and second portions of the device 2. As shown, fastener 22 provides an elongate axis of rotation. The elongate of axis of rotation provided by fastener 22 provides for an axis of rotation with respect to first member 4 and second member 6 as well as defines the rotation about which lever arms 12 may be rotated. Rotation of both lever arms 12 and second member 6 with respect to first member may be facilitated by loosening of the fastener 22 and knob 14 combination, and similarly may be restricted by the tightening of the fastener 22 and knob 14 combination.

Fastener 22 may comprise a threaded or partially-threaded bolt. In one embodiment, for example, at least a distal end of the fastener 22 is threaded for communicating with a portion of the knob 14 and for providing a clamping force on the device. In various embodiments, a central portion of the fastener 22 may be non-threaded, such that rotation of additional elements of the device is enabled. Accordingly, the present invention is not limited to any particular fastener device. Rather, a wide array of fasteners including threaded bolts, partially-threaded bolts, pins, rivets, and various other connectors and fasteners are expressly contemplated as being within the scope of the present invention.

Figure 6:
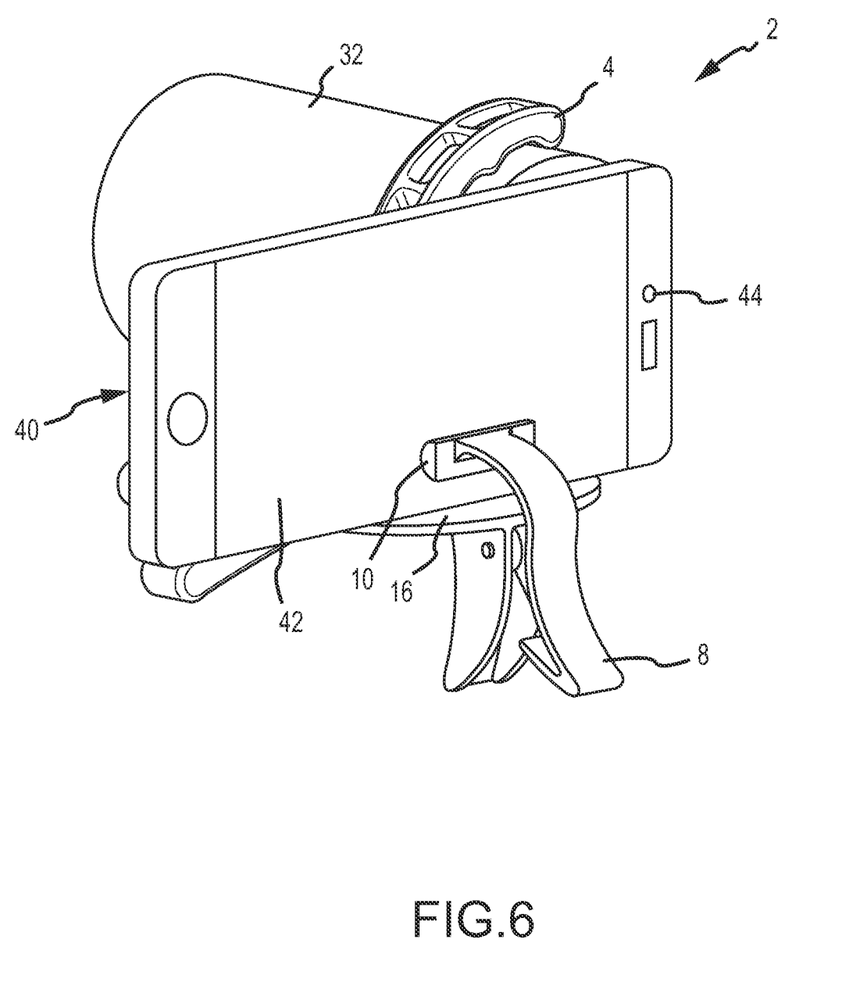
FIG. 6 is a front perspective view of an imaging device mount according to one embodiment attached to a sighting device and housing an imaging device.

Referring now to FIG. 6, an electronic device 40 is provided in combination with the device mount 2. As shown, a lens or similar feature provided on the electronic device 40 may be aligned with an axis of a sighting device 32 such that images viewed through the sighting device 32 are incident upon and/or recorded by the imaging device 40. One of skill in the art will recognize that various electronic devices comprise lenses or other features in various locations and/or orientations. As such, features of the present invention contemplate various degrees of freedom and modes for adjustment of the position of the electronic device 40 within the mount 2. Additionally, acquiring an image at the proper focus may require minor adjustment of the lens with respect to the central axis of the sighting device 32. That is, a central axis of the sighting device 32 may not necessarily be the desired or preferred position of the lens of an electronic device. As such, the present invention contemplates accommodating an electronic device 40 at a non-discreet number of positions, such that it may be selectively aligned with a sighting device in order to record or view images through the sighting device 32.

Features of the present invention therefore receive an electronic device 40 with various image acquisition or recording means 44, such that a sighting device 32 and an electronic device 40 may be placed in communication. For example, an imaging device 40 may comprise a screen or viewing window 42 through which images received through or by a sighting device 32 and image acquisition means 44 may be displayed or viewed. In addition or in lieu of such image displays 42, electronic devices may record images received by a sighting device 32 and image acquisition means 44. Image acquisition means 44 may comprise, for example, one or more lenses and associated features provided on a device 40.

Figure 7:
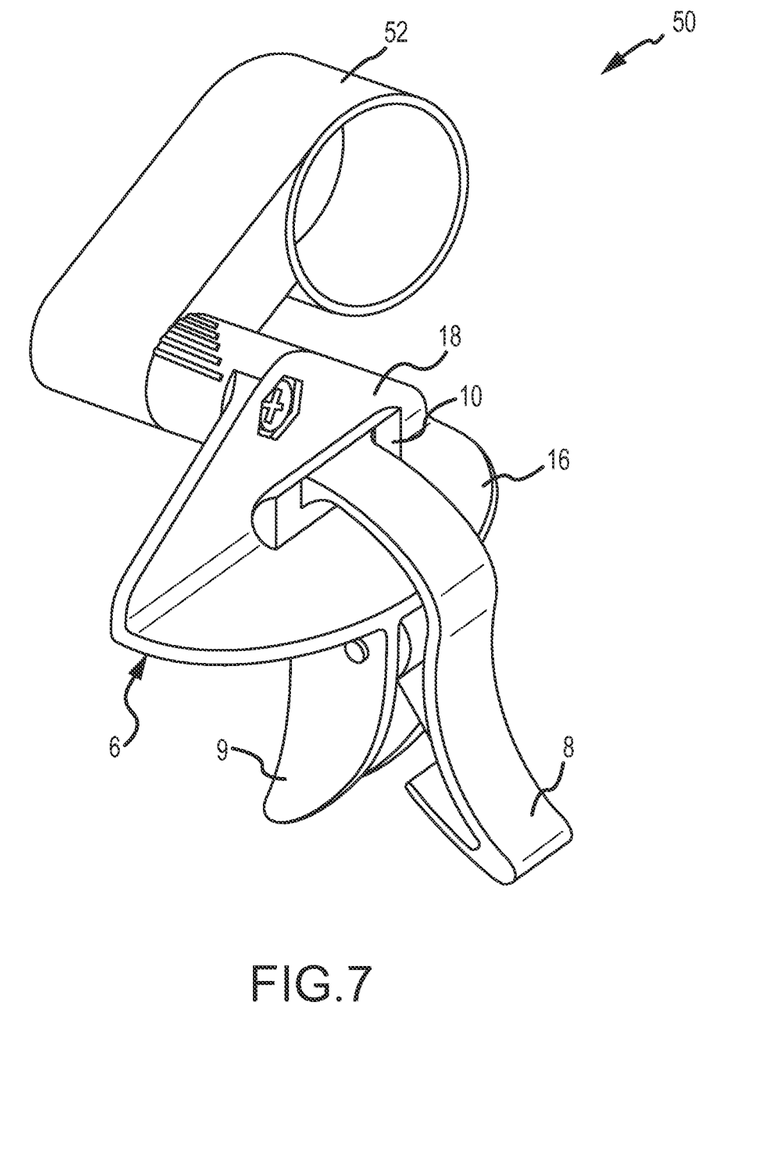
FIG. 7 is a front perspective view of an imaging device mount according to one embodiment.

FIG. 7 is a perspective view of a mount member according to an alternative embodiment. As shown, an alternative embodiment of a mount 50 is provided wherein the mount 50 is securable to a sighting device (not shown) through rigid or semi-rigid attachment means. In FIG. 7, the attachment means comprise a substantially rigid cup 52 for connecting to a portion of a sighting device. The cup 52 preferably comprises an internal diameter that is substantially equal to or slightly larger than an outer diameter of a portion of a particular sighting device. Based on this dimensional relationship, the cup 52 may be press-fit or frictionally fit around the sighting device in a secure manner. Additional features may be provided to contract and/or secure the inner diameter of the cup 52 to a device. For example, hose clamps and similar features known to those skilled in the art may be employed to increase the range of an internal diameter of the cup feature. The cup may extend and/or be connected to various additional components as shown and described herein, including second component 6 and various associated features.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A mount for an imaging device which is adapted for positioning with a viewing device, comprising:

a first portion selectively securable to the viewing device, said first portion comprising at least one member rotatable about an axis for selectively expanding and contracting said first portion;

a second portion connected to said first portion by an adjustable fastener, said second portion adapted for selectively receiving an imaging device, said second portion comprising a substantially planar member for receiving at least a portion of said imaging device and a biased member for securing the imaging device in a desired location, wherein said imaging device can be selectively aligned with said viewing device to receive and record an image; and wherein said axis comprises a longitudinal axis of said fastener.

2. The mount of claim 1, wherein said first portion comprises a hinged clamp with a coil spring.

3. The mount of claim 1, wherein said biased member comprises a hinged member with a coil spring.

4. The mount of claim 1, wherein said second portion comprises a first substantially planar member and a second substantially planar member for supporting an imaging device, said first substantially planar member being substantially perpendicular to said second substantially planar member.

5. The mount of claim 1, wherein said biased member is rotatable about an axis substantially perpendicular to said axis of rotation of said at least one member of said first portion.

6. The mount of claim 1, wherein said imaging device comprises at least one of a portable phone, a digital camera, a PDA, and a digital music player.

7. The mount of claim 1, wherein said viewing device comprises at least one of a rifle scope, a spotting scope, a binocular, a monocular, a telescope, and a range finder.

\* \* \* \* \*